United States Patent [19]

Meess et al.

[11] Patent Number: 4,955,983
[45] Date of Patent: Sep. 11, 1990

[54] SIDE LOADING VAULT SYSTEM AND METHOD FOR THE DISPOSAL OF RADIOACTIVE WASTE

[75] Inventors: Daniel C. Meess, Murrysville; Bobby J. Jones, Pleasant Hills; Raymond M. Mello, Greensburg; Thomas G. Weiss, Jr.; James B. Wright, both of Murrysville, all of Pa.

[73] Assignee: Westinghouse Electric Corp., Pittsburgh, Pa.

[21] Appl. No.: 331,587

[22] Filed: Mar. 31, 1989

[51] Int. Cl.⁵ .............................. B09B 1/00; G21F 9/12
[52] U.S. Cl. ................................. 405/128; 405/129; 52/169.6
[58] Field of Search .............. 405/129, 128, 52, 53; 52/169.6, 21; 252/626, 633, 628

[56] References Cited

U.S. PATENT DOCUMENTS

| | | | |
|---|---|---|---|
| 2,704,983 | 3/1955 | Van Dronkelaar | 52/169.6 X |
| 3,255,896 | 6/1966 | Sklorz | |
| 3,385,012 | 5/1968 | Loregreen | 52/21 |
| 3,705,851 | 12/1972 | Brauer | |
| 4,166,709 | 9/1979 | Valiga | |
| 4,336,674 | 6/1982 | Weber | 52/169.6 |
| 4,375,930 | 3/1983 | Valiga | 405/128 |
| 4,453,857 | 6/1984 | Serra et al. | 405/128 |
| 4,586,849 | 5/1986 | Hastings | |
| 4,624,604 | 11/1986 | Wagner et al. | 405/128 |
| 4,631,872 | 12/1986 | Daroga | 52/169.6 X |
| 4,701,280 | 10/1987 | Canevall | |
| 4,776,982 | 10/1988 | Canevall | |
| 4,784,802 | 11/1988 | Mallory et al. | 405/128 X |
| 4,844,840 | 7/1989 | Feizollahi | 405/129 X |

Primary Examiner—Dennis L. Taylor

[57] ABSTRACT

A side loading system and method for the underground disposal of radioactive waste is disclosed herein. The vault system is formed from at least one vault cell that comprises a floor slab disposed within a recess in the earth, a ceiling slab disposed over the floor slab, an earth cap disposed over the ceiling slab and an elongated wall assembly disposed around the periphery of the floor slab for supporting the ceiling slab and earth cap. The elongated wall assembly is preferably four times as long as it is wide, and includes a back wall and a front wall, the front wall having an accessway for the side loading of radioactive waste. Radioactive waste is loaded in sequential rows starting from the back wall of the vault cell. Such a loading technique, in combination with the elongated shape of the wall assembly, minimizes radiation exposure to the personnel loading the vault cell as the front-most row of waste helps to shield the operators from radioactivity emitted by the balance of the waste contained within the vault cell. Additionally, because the ceiling slab does not depend upon the waste for support, each vault cell can be completely constructed and then inspected for structural faults before radioactive waste is loaded therein. Finally, the side-loading configuration of the vault cells advantageously shelters radioactive waste from ambient weather during the loading operation.

28 Claims, 5 Drawing Sheets

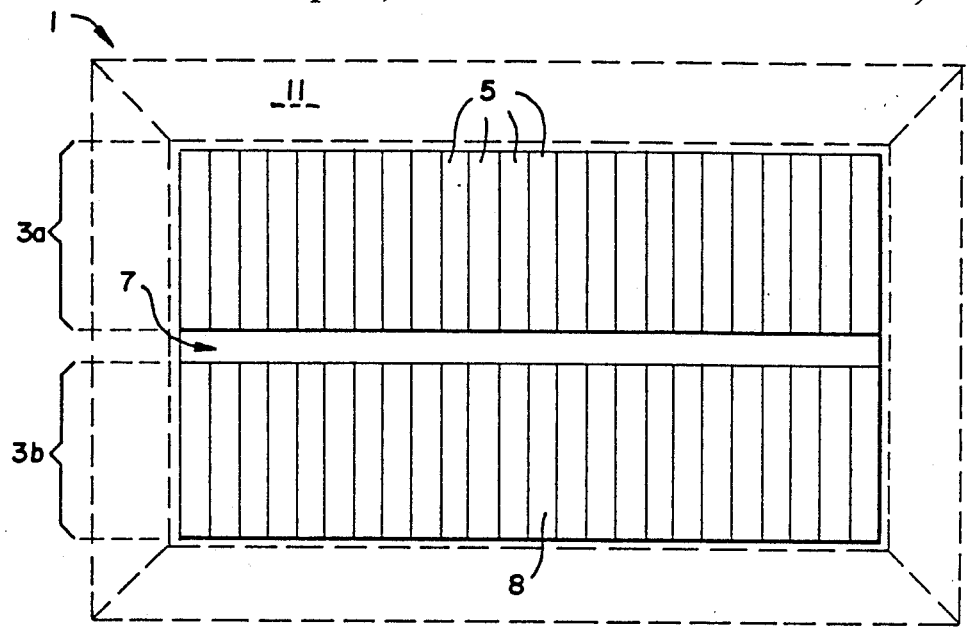
FIG. 2
FIG. 3
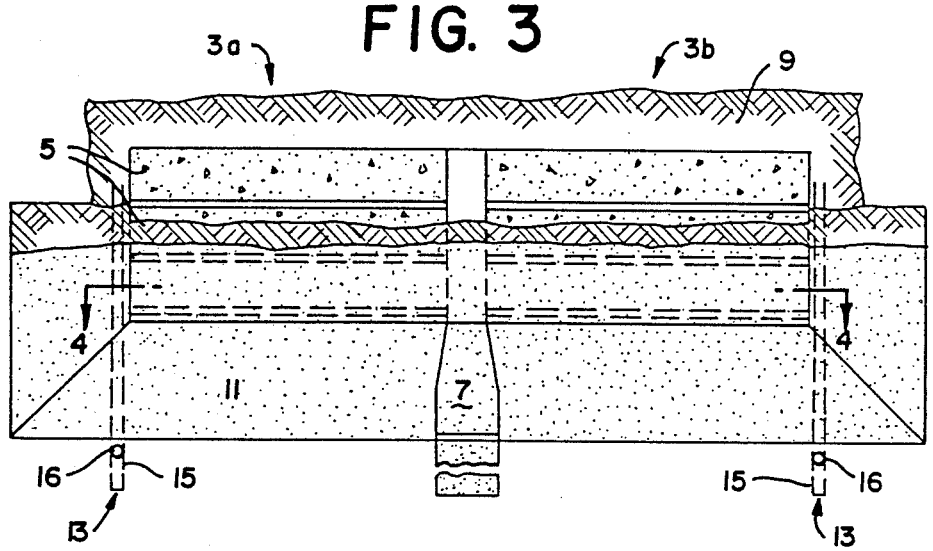
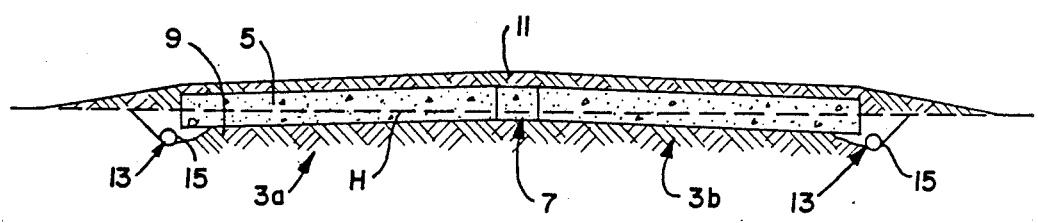
FIG. 4

SIDE LOADING VAULT SYSTEM AND METHOD FOR THE DISPOSAL OF RADIOACTIVE WASTE

BACKGROUND OF THE INVENTION

This invention generally relates to vault systems for the below ground disposal of hazardous waste, and is specifically concerned with a side loading vault system and method for the disposal of low-level radioactive waste.

Burial systems for the disposal of radioactive and other types of hazardous waste are known in the prior art. In some of these systems, a large hole is excavated in the earth, and a floor structure formed from a concrete slab and a layer of gravel is constructed therein. Radioactive waste that has been packaged in 55 gallon steel drums is then stacked over the floor structure of the burial site. In some of these systems, monitoring equipment in the form of drain pipes is laid around the floor structure so that leakages of radioactive wastes through the 55 gallon steel drums may be detected before the waste has an opportunity to contaminate ground water. After the burial site has been completely filled with radioactive waste, water impermeable layers of plastic material and compacted clay are placed over the waste, followed by an earth cap onto which erosion-resistant vegetation is often planted. In some burial type systems, a layer of concrete is poured over the waste prior to overlaying it with compacted clay and an earth cap.

Unfortunately, there are a number of shortcomings associated with such prior art burial-type systems that significantly limit their ability to provide safe and inexpensive storage for hazardous waste. One major shortcoming of such a system is its inability to provide an inexpensive and convenient means of retrieving leaking waste containers. Thus, if the monitoring equipment that is built into these systems should ever indicate the presence of a serious radioactive leak from the containers disposed therein, a large portion of the earth cap, compacted clay, water impermeable plastic and concrete overlying the waste containers would have to be removed, and the leaking containers painstakingly located by lifting the containers out of the burial cavity one-by-one. After the leaking container or containers were finally located, the disassembled portion of the site would, of course, have to be completely reconstructed. Still another shortcoming associated with such prior art burial site designs is the fact that the open burial cavity exposes the waste to rain and other ambient weather conditions during the loading operation. Since it may take as long as four to six months for a utility to completely fill such a burial site with waste, a considerable amount of rain water can accumulate over the floor slab of such a site. While this rain water can be periodically pumped out, the expense associated with such an effort is significant. Moreover, the presence of any standing water in such a site for any length of time promotes the occurrence of corrosion and leaching through the walls of the waste containers in contact with such water. Still another shortcoming associated with such prior art burial sites is the amount of radiation that the system workers receive when loading such a site. The geometry of a top-loaded burial site is such that a worker standing near the rim is exposed to radiation from most every radiation container. Even when the waste deposited in such burial sites is rated as low-level radioactive waste, the effects of such radiation exposure are, unfortunately, cumulative. In addition to radiation hazards, the craning-in of waste packages into a top-loaded burial site makes possible the occurrence of a waste-dropping accident, which could rupture or otherwise damage one or more of the waste containers within the burial site. Finally, because the ceilings of such burial sites depend upon the waste itself for structural support, there is no way that the system operators may reliably inspect the ceilings of such sites for structural faults prior to loading of the waste therein.

Vault-type systems for the storage of such radioactive wastes are also known in the prior art. While such vault-type systems can overcome some of the disadvantages associated with burial-type systems such as the exposure of the waste to ambient weather conditions, none of these systems of which the applicants are aware affords the system operators a convenient and expeditious way of retrieving a leaking waste container in the event that the monitoring equipment indicates the existence of a hazardous leak condition. Moreover, large unitary vault systems formed from brittle construction materials such as concrete are susceptible to cracking in the event of subsidence or a seismic disturbance.

Clearly, there is a need for a vault-type system and method for the disposal of radioactive waste that affords convenient and expeditious access to the contents of the vault in the event that the radiation monitoring system indicates that a dangerous leak condition has arisen. Ideally, such a vault system should shelter the waste from the ambient weather during the loading operation and expose the system operators to only a minimal amount of radiation. The vault system should have the capacity to store large volumes of radioactive waste but yet not be susceptible to cracking in the event of subsidence or seismic disturbances. Finally, the vault system should be amenable to inspection prior to the loading of waste packages therein, and should not set the stage for the occurrence of dropping accidents which could rupture or otherwise damage waste containers during the loading operation.

SUMMARY OF THE INVENTION

The invention is a side loading vault system and method for the subterranean disposal of radioactive waste that overcomes the shortcomings associated with the prior art. The system is formed from at least one vault cell that comprises a floor slab typically disposed within a recess in the earth, a ceiling slab disposed over the floor slab, an earth cap disposed over the ceiling slab, and an elongated wall assembly disposed around the periphery of the floor slab for supporting the ceiling slab and the earth cap. The wall assembly may include a back wall and a front wall, the front wall having an access way for loading radioactive waste within the vault cell, wherein the elongated shape of the wall assembly reduces the amount of radiation present in the area of the cell between the waste disposed therein and the front wall accessway when waste is loaded in sequential rows from the back wall to the front wall of the cell. The vault cell preferably includes a removable wall structure for sealing the accessway in the wall assembly after the cell has been completely filled with radioactive waste. The removable wall structure may be constructed by assembling a plurality of mutually interfitting wall elements that resemble T-shaped concrete blocks. The removability of this wall structure advantageously affords access to the waste contained within the cell in the event of a leakage condition without the need for penetrating either the ceiling slab or the integral walls of the wall assembly. Finally, a monitoring aisleway is left between the waste and the inner surface of the walls of the cell so that monitoring equipment may be moved around the cell perimeter.

The vault system may include two rows of vault cells that are separated by a loading aisle used both for loading and unloading radioactive waste from the cells. Preferably, one of the cells is left empty after all of the other cells have been filled with radioactive waste. This empty cell provides a space within the vault system for temporarily "parking" the contents of a filled vault cell in which a leakage condition has been detected so that a maintenance or repair operation may be conveniently conducted in the leaking cell. The loading aisle includes a floor slab and a ceiling slab substantially coplanar with the floor slabs and ceiling slabs of the vault cells. The loading aisle remains empty after all the vault cells have been loaded to afford a clear accessway to every cell in the event a cell repair becomes necessary. Vault cells in the same row are mutually separated by means of expansion joints so as to render individual cells relatively movable with respect to each other in the event of a seismic disturbance or ground settling. Such relative movability avoids the generation of wallcracking stresses which could occur if the cells were rigidly interconnected. Similarly, expansion joints are placed between the two rows of vault cells and the floor and ceiling slabs of the loading aisle assembly to render the loading aisle assembly independently movable with respect to the vault cells.

In the method of the invention, the floor slab of a cell is first constructed within a below grade recess in the earth, and an elongated wall assembly is constructed over the floor slab that has a back wall and a front wall at either end. In the preferred embodiment, the wall assembly is formed from a rectangular array of integrally formed, concrete walls wherein the length of this wall assembly is preferably five times as long as its width. An accessway for loading radioactive waste within the wall assembly is provided in the front wall preferably at the time that the front wall is fabricated by the pouring of concrete into a wall-shaped form. A monolithic ceiling slab is then constructed which is supported by the upper periphery of the wall assembly. An earth cap is then placed over the ceiling slab in order to complete the construction of an individual vault cell.

Prior to filling the vault cell with radioactive waste, the cell is inspected for any structural faults which may have occurred after the ceiling slab and the earth cap have applied their respective weights to the wall assembly. Next, the vault cell is loaded with radioactive waste from its back end to its front end. In the preferred method of the invention, the radioactive waste is packaged into stackable units such as the hexagonally shaped SUREPAK ® modules developed by the Westinghouse Electric Corporation. These units are stacked into rows which are parallel to the back wall, the rows being formed sequentially from the back wall toward the front wall so that the waste in the frontmost row shields the area in the vault cell between the waste in the front wall from radiation emitted by the rows of waste behind it. This stacking procedure, coupled with the elongated shape of the wall assembly, substantially reduces the amount of radiation absorbed by the persons implementing the waste loading operation.

After a particular vault cell is completely filled with radioactive waste, the removable wall structure is assembled over the accessway by stacking up a plurality of T-shaped, interfitting concrete blocks. A permanent wall having a frangible portion may then be constructed over the removable wall structure at some future time after which access to the disposal cell is no longer required.

The foregoing system and method effectively keeps rain water out of the vault system during the loading operation since each vault is completely enclosed with its own sealing at the time it is loaded. Additionally, the side loading afforded by the accessway and the wall assembly substantially reduces the chance of a waste container rupturing as the result of an accidental dropping of such a container, since cranes are not used to lower such containers down within the vault cells. Man-rem exposure is also substantially lessened due to the radiation minimizing elongated geometry of each of the vault cells, and the a shielded forklift to load the vault cells. The fact that the ceiling slabs are supported by the wall assemblies instead of the waste itself allows the vault cells to be thoroughly inspected before being loaded, thereby giving the system operators ample opportunity to correct water-leaking structural faults which may have occurred during construction. Finally, the provision of expansion joints between all of the components of the vault system and the independent movement of each of these components afforded thereby substantially reduces the chances of wall fractures from occurring from localized stresses in the event of a seismic disturbance or ground settling forces.

BRIEF DESCRIPTION OF THE SEVERAL FIGURES

FIG. 2 is a plan view of the vault system illustrated in FIG. 1, illustrating the parallel configuration of the two rows of vault cells that form the vault system;

FIG. 3 is an enlarged plan view of the vault system illustrated in FIG. 2, illustrating some of the layers of the earth cap that cover the individual vault cells of the system;

FIG. 4 is a cross-sectional view of the vault system illustrated in FIG. 3 along the line 4—4;

Figure 6C:
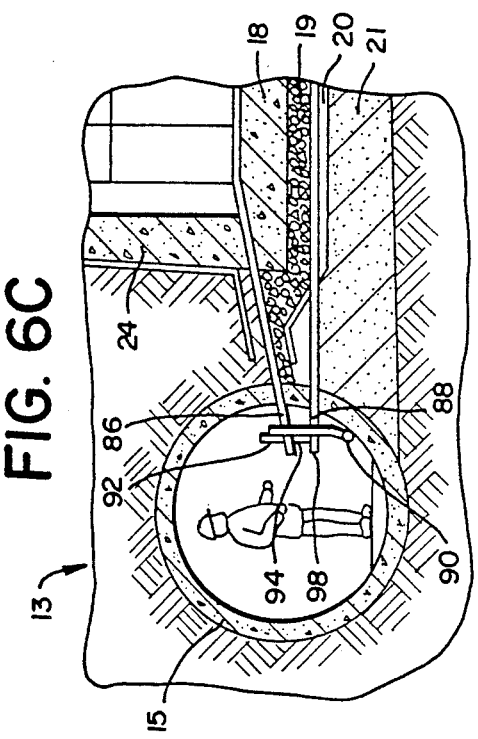
FIG. 6A is another plan view of the vault system as shown without either the earth cap, the ceiling slabs, or the waste modules so that the gridwork of drainage channels and feeder channels present in the ceiling slabs of each vault cell may be easily seen.
FIG. 6B is an enlarged cross-sectional side view of one of the drainage or feeder channels in a ceiling slab of a vault cell.
Figure 7:
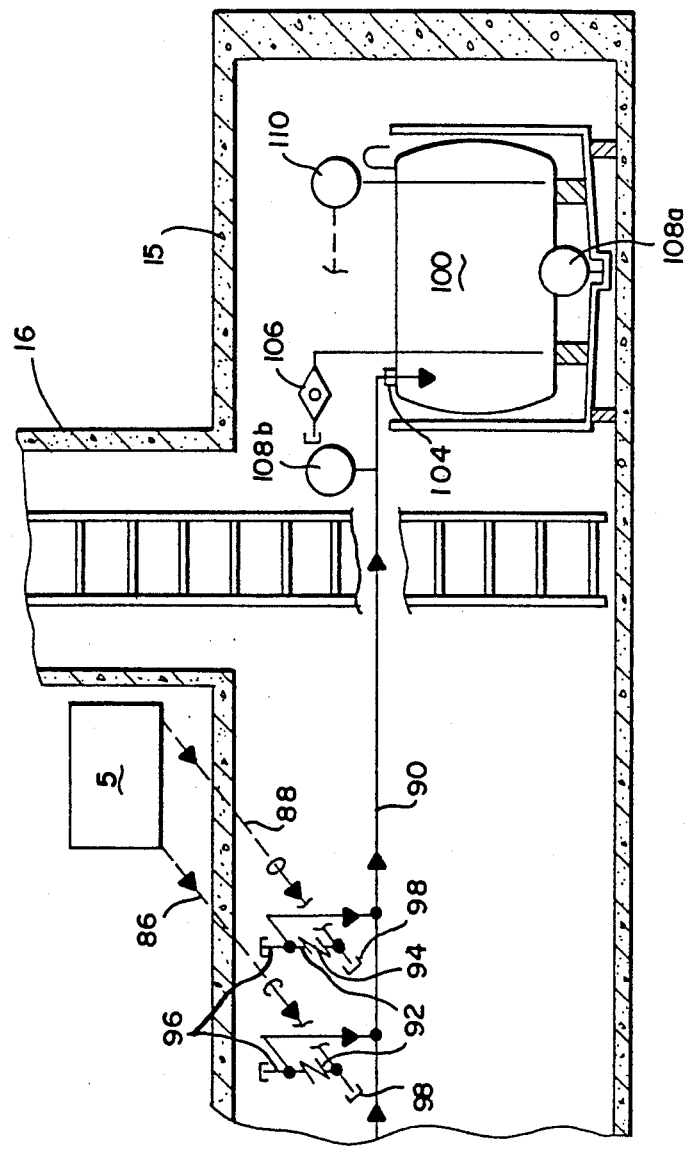

FIG. 6C is an enlarged cross-sectional end view of the access tunnel of the drainage system which allows the system operators to obtain access to both the primary and secondary drainage conduits and the manifold which interconnects them, and FIG. 7 is a partial cross-sectional side view of the access tunnel of the drainage system, illustrating the liquid collection tank connected to the manifold conduit of the drainage system.

DETAILED DESCRIPTION OF THE PREFERRED EMBODIMENT

Figure 1:
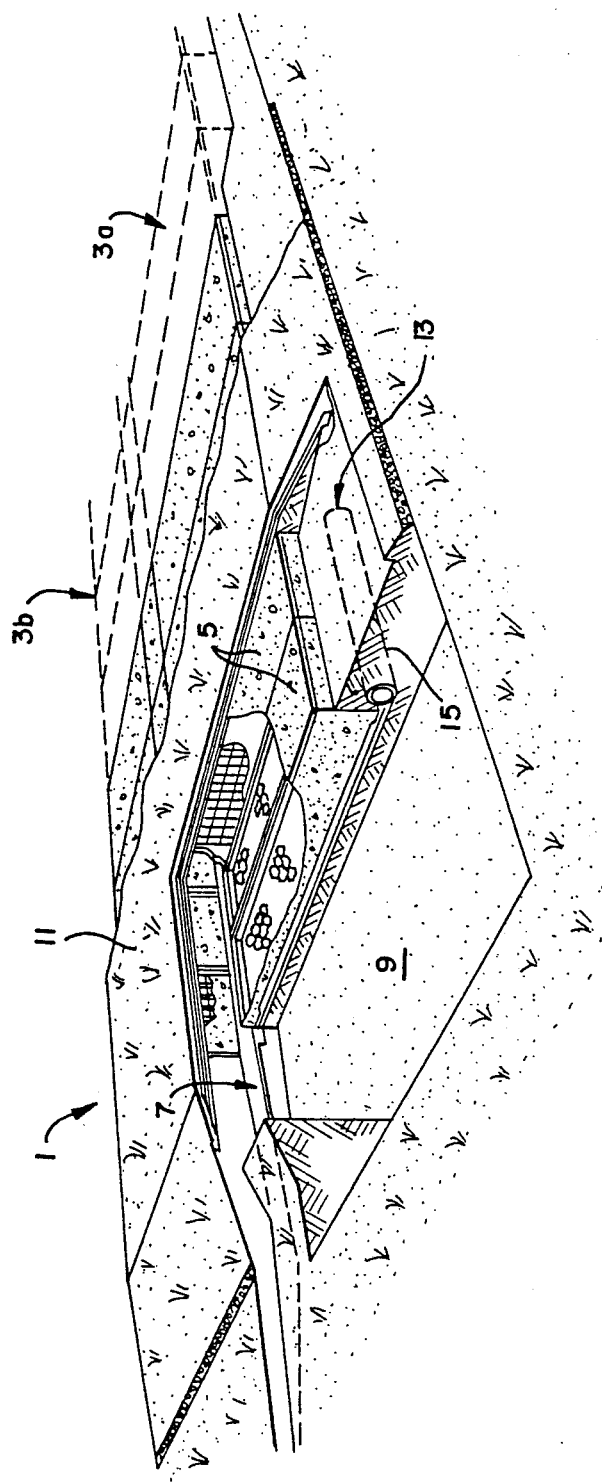
FIG. 1 is a perspective view of the inspectable vault system embodying the invention.

With reference now to FIGS. 1 and 2, wherein like numerals designate like components throughout all of the several figures, the inspectable vault system 1 of the invention is generally comprised of two parallel rows 3a,3b of vault cells 5, each of which preferably includes twenty-five cells a piece. The two rows 3a,3b of vault cells 5 are separated by a loading aisle 7 that provides access to the side-opening present in each cell 5. One of the rows 3b of vault cells 5 includes one cell 8 which remains empty after all of the remaining vault cells 5 have been filled. As will be described in more detail hereinafter, the empty cell 8 provides valuable temporary "parking" room for the waste container stacked within one of the other vault cells 5 when it is necessary to service a leak condition occuring in one of the loaded cells 5. Both of the rows 3a,3b of cells 5 are subterranean, being placed within a recess 9 in the earth which may be either a natural below-grade topological feature or formed by excavation. The two rows 3a,3b of cells 5 are covered by an earth cap 11 formed in part from water-shedding compacted clay and a geomembrane material. A drainage system 13 for removing water and other liquids which may collect within the vault system 1 circumscribes the two rows 3a,3b of vault cells 5. The drainage system 13 generally includes an access tunnel 15 that allows a system operator to access a liquid manifold that communicates with each of the vault cells 5. Manholes 16 are provided at the ends of the access tunnel 15 to allow a system operator to climb underground into the tunnel 15.

Figure 5A:
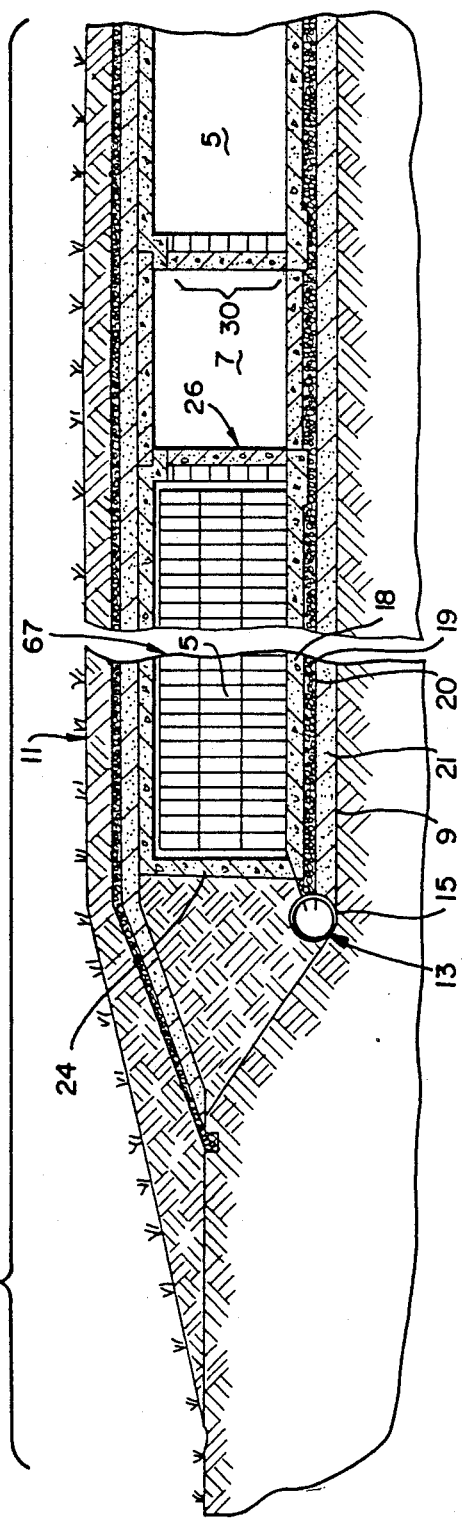
FIG. 5A is an enlarged cross-sectional side view of the vault system.

With reference now to FIGS. 3, 4 and 5A, each of the vault cells 5 of the system 1 includes a floor slab 18 which is preferably approximately one meter thick. As is best seen in FIG. 4, the floor slab 18 of each cell 5 is sloped with respect to the horizontal H to encourage water or other liquids which may collect within the cells to drain toward the drainage system 13. A relatively small slope of approximately one to three percent should be sufficient for such drainage purposes. Each floor slab 18 is also sloped in the direction transverse to the "down hill" slope evident in FIG. 4 so that any liquids collected within the cells 5 will flow toward a specific corner of the cell 5. Of course the floor slab 18 should be formed from a substance which is relatively liquid impermeable, such as hardened concrete.

Figure 5B:
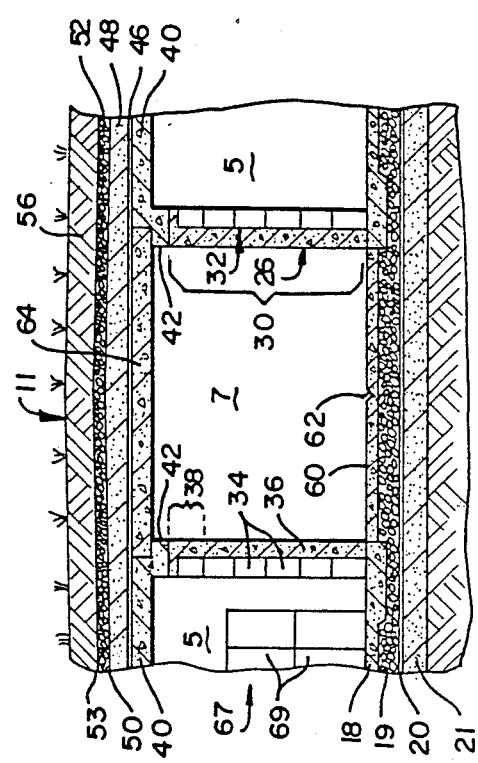
FIG. 5B is an enlarged cross-sectional side view of the loading aisle of the vault system illustrated in FIG. 5B.

As is best seen with respect to FIGS. 5A and 5B, the floor slab 18 of each individual vault cell 5 rests on top of a gravel drain layer 19 which in turn overlies a water impermeable geomembrane 20 that may be formed from polyvinylchloride or other appropriate hydrophobic material. Geomembrane 20 in turn lies over a compacted layer of clay 21 which is preferably at least about one meter thick. The purpose of all of the underlying floor layers 19, 20 and 21 is, of course, to encourage any liquids which may seep through the floor slab 18 of a particular cell 5 to flow into the drainage system 13.

Figure 5C:
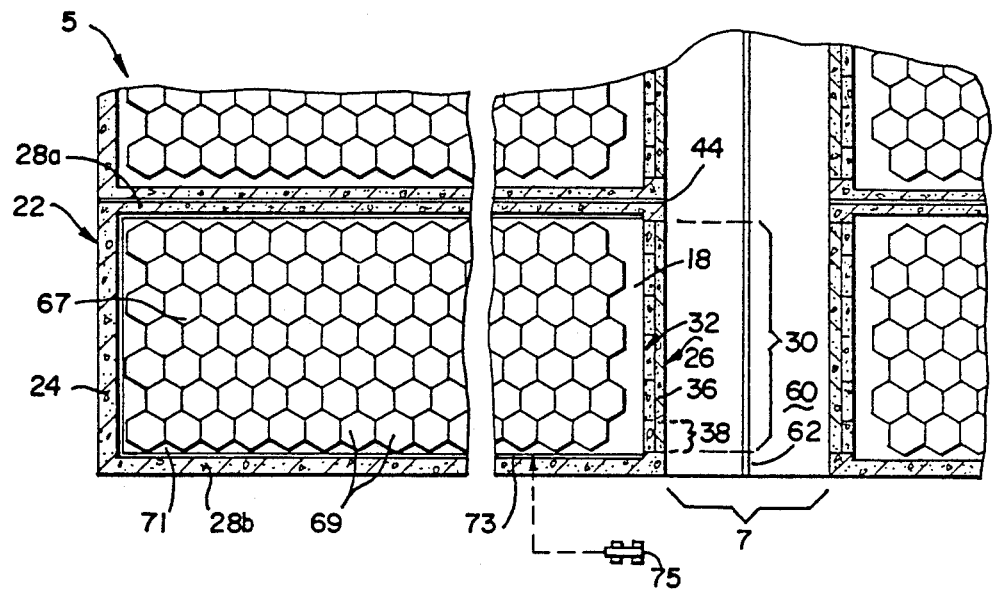
FIG. 5C is an enlarged plan view of the vault system with the earth cap and ceiling slabs removed therefrom.

With specific reference now to FIG. 5C, each of the vault cells 5 includes a wall assembly 22 which circumscribes the edge of the floor slab 18 and is preferably integrally formed therewith. The wall assembly 22 includes a back wall 24, a front wall 26 and a pair of side walls 28a,28b. An accessway 30 subsumes all but the side edges of the front wall 26 in order to facilitate the loading of waste containers therein. The balance of the front wall 26 is formed from a removable wall structure 32 formed from interfitting concrete blocks 34, and a permanent wall 36 of poured concrete which covers the removable wall structure 32 after the cell 5 has been completely filled with containers of waste. In the preferred embodiment, both the floor slab 18 and all of the components of the wall assembly 22 are formed from steel reinforced concrete. Additionally, to facilitate access to the interior of the vault cell 5 after the removable wall structure 32 and the permanent wall 36 have been installed, the permanent wall 36 includes a frangible section 38 approximately one meter square and located in an upper corner of the permanent wall 36 as indicated. As will be discussed in more detail hereinafter, the frangible section 38 allows a corner of the permanent wall 36 to be neatly broken out in the event that the system operators wish to install a movable video camera within the cell 5.

With specific reference again to FIG. 5B, each of the vault cells 5 is provided with a ceiling slab 40 formed from a unitary section of reinforced concrete that is completely supported by the upper edges of the wall assembly 22. The front edge of the ceiling slab 40 includes a support ledge 42 for supporting the ceiling slab of the loading aisle 7 which will be discussed in detail shortly.

With reference now to FIGS. 5A, 5B and 5C, expansion joints 44 are provided between the side walls 28a,28b of adjacent vault cells 5 so that each individual vault cell 5 may move in response to subsidence or seismic disturbances without necessarily applying large stresses on its neighbor cells. While the dimensions of the walls and the proportions of the vault cells 5 may vary considerably and still fall within the purview of the instant invention, the floor slab 18, back and front walls 24,26 of the wall assembly 22, and the ceiling slab 40 are each preferably one meter thick, while the side walls 28a,28b of adjoining cells 5 are each approximately 0.5 meters thick. Side walls 28a,28b which are not adjacent to the side walls of another cell 5 are preferably one meter thick as may be seen to side wall 28b in FIG. 5C. In the preferred embodiment, the length of each of the cells 5 is preferably about five times the cell width, for two reasons. First, such proportioning creates a favorable shield geometry when the system operator fills the vault cells 5 with radioactive waste by stacking it from the back wall 24 toward the front wall 26. This is due to the fact that the frontmost row of waste containers effectively blocks much, if not all, of the radiation emitted by the other rows of waste containers stacked behind the frontmost row. Second, such proportioning minimizes the sag experienced by the ceiling slab due to the relatively distance between the side walls 28a,28b which support it. This is an important advantage, as the ceiling slab 40 must not only support its own weight, but also the weight of the earth cap 11. In the preferred embodiment, each cell 5 is approximately 16×95 meters.

As may best be seen in FIG. 5B, the earth cap 11 which covers the ceiling slab 40 includes a water impermeable geomembrane cover 46 which overlies the upper surface of the ceiling slab 40, and a layer 48 of compacted clay approximately 0.66 meters thick which in turns overlies the geomembrane cover 46. The principal purpose of both the cover 46 and the clay layer 48 is, of course, to shed water away from the vault cells 5. The earth cap 11 further includes a water permeable geotextile 50 which covers the upper surface of the clay liner 48, as well as a filtered drainage layer 52 consisting of sand and gravel approximately 0.66 meters thick with overlies the geotextile fabric 50. Another layer of water permeable geotextile 54 covers the upper surface of the filtered drainage layer 52 so that the layer 52 is, in effect, "sandwiched" between the geotextile layers 50 and 54. A layer 56 of native soil overlies the geotextile layer 54 as shown. The purpose of the filtered drainage layer 52 and the two layers 50 and 54 of geotextile is to rapidly drain any water or other liquid which should permeate the native soil layer 56 so that the clay layer 48 and the geomembrane cover 46 may rapidly shed such water away. The structure of the loading aisle 7 is also clearly evident in FIG. 5B. Like the previously discussed vault cells 5, the loading aisle 7 also includes a floor slab 60 which overlies the previously discussed gravel drain layer 19, geomembrane 20, and compacted clay layer 21. A drain 62 is centrally disposed along the longitudinal axis of the floor slab 60. This drain 62 may take the form of a shallow trough approximately five centimeters deep and ten centimeters wide that is molded within the floor slab 60. Finally, the loading aisle 7 includes a ceiling slab 64 not unlike the ceiling slabs 40 of the vault cells 5. These ceiling slabs 64 are supported by the previously discussed ledges 42 which form an integral part of the front edges of each cell vault ceiling slab 40. In the preferred embodiment, the loading aisle 7 is 10-11 meters wide. As may best be seen in FIGS. 5C and 6A, the interior of each of the vault cells 5 is preferably loaded with a stacked array 67 of modular, interfitting waste containers 69 which, in the preferred embodiment, are hexagonal SUREPAK ® modules developed and patented by the Westinghouse Electric Corporation. The array 67 of waste containers 69 is spaced approximately 0.66 meters away from the inside surfaces of the wall assembly 22 in order to provide a monitoring aisleway 71 which is suitable for either a man or a monitoring device to move in. Moreover, a track 73 is preferably attached around side wall 28a, back wall 24, and side wall 28b as shown at a height which is approximately level with the top of the array 67. The purpose of the track 73 is to guide a motorized video camera 75 around the monitoring aisleway 71 in the event that a monitoring or a maintenance operation is necessitated within the interior of the vault cell 5. The preferred method of installing such a video camera 75 onto the track 73 is, of course, to remove one or more of the interfitting blocks 34 that forms the removable wall structure 32 before the permanent wall 36 is installed, and to remove frangible section 38 and one or more blocks 34 after wall 36 is installed.

While there are many advantages associated with the use of SUREPAK ® modules in conjunction with the vault cells 5, one advantage that should be expressly recognized is the fact that the physical dimensions of the SUREPAK ® modules allows the provision of the 0.66 meters wide monitoring aisleway 71 without any danger that a waste container 69 will fall into the aisleway 71 from the effect of a seismic disturbance. This arises from the fact that the diameter of the SUREPAK ® modules (which is approximately two meters) is over three times the width of the monitoring aisleway 71. Hence there is essentially no chance that any of the modules 69 will fall into the aisleway 71 and rupture on the floor slab 18 if the containers 69 are stacked in the mutually-contiguous array 67 shown. If the waste containers 69 were made to be relatively small relative to the width of the monitoring aisleway 71, it is easy to see that one or more of such containers 69 could indeed fall into the monitoring aisleway 71.

Figure 6A:
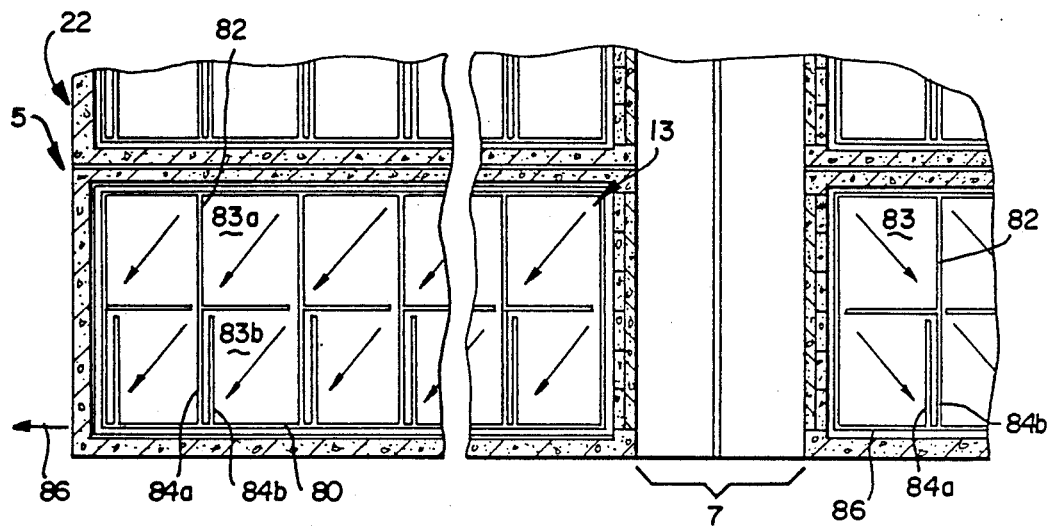
Figure 6B:
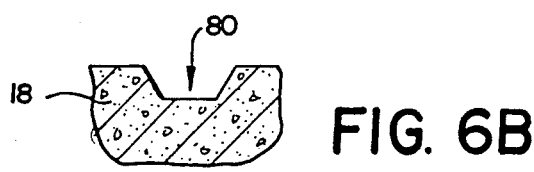

Turning now to FIGS. 6A, 6B and 6C, the drainage system 13 includes, for each vault cell 5, a central drainage channel 80 disposed along one edge of the floor slab 18 of each cell 5 as shown. As has been previously indicated, the floor slab 18 of each vault cell 5 is sloped at least one percent with respect to both its length and its width so that any liquids which collect upon the floor slab 18 tend to run toward one of the side edges of the slab 18. The drainage channel 80 is, of course, located along this lowest edge of the slab 18. In addition to the drainage channel 80, the system 13 includes a grid-like network of feeder channels 82 which ultimately empty into the main drainage channel 80. This gridwork of feeder channels 82 divides the area of the floor slab 18 into a plurality of rectangular zones of which 83a, 83b are exemplary. Each of these zones are in turn drained by a separately identifiable feeder channel 84a, 84b, respectively. The advantage of such a configuration of feeder channels 82 is that it allows the system operator to infer which zone or zones a leakage condition has occurred by merely noting which of the feeder channels 83a, 83b is conveying water or other liquid to the drainage channel 80. Because the drainage channel 80 and its interconnections with the feeder channels 82 are incorporated within the monitoring aisleway 71, the system operator may utilize the previously described motorized video camera 75 to tell him which of the feeder channels 82 is conveying liquid to the main drainage channel 80 since wet concrete is substantially darker than dry concrete. In the alternative, electronic moisture sensors that generate remotely receivable signals maybe placed at the junctions between the feeder channels 82 and the main drainage channel 80.

With reference now to FIG. 6C and FIG. 7, the drainage channel 80 of each of the vault cells 5 is connected to a primary cell drainage conduit 86 which in turn is connected to a manifold conduit 90. Also connected to the manifold conduit 90 is a secondary drainage conduit 88 which is disposed beneath the floor slab 18 of each of the vault cells 5. The purpose of each of the secondary drainage conduits 88 is to drain any water or other liquids which may collect within the gravel layer 19 and geomembrane 20 which exist beneath the floor slabs 18 of each cell 5. Such liquid might collect within the gravel layer 19 as the result of a crack in the floor slab 18, or as the result of a substantial rise in the subterranean water table.

A moisture detector 94 is disposed in each of two pipe segments which separately interconnect the ends of the primary and secondary drainage conduits 86 and 88 with the manifold conduit 90. The moisture detector 94 may take a variety of forms. In one embodiment of the invention, the moisture detector 94 is simply a float disposed within a transparent elbow. In the alternative, moisture detector 94 may be any one of a number of commercially available electronic devices. A sample collection tap 96 is also provided at the end of both the primary and the secondary drainage conduits 86 and 88. These taps 96 allow an operator walking within the access tunnel 15 to obtain a sample of any liquid leaking out either over or under the floor slab 18 so that the composition and radioactivity of the liquid may be tested. The ends of both the primary and secondary drainage conduits 86 and 88 also include a clean out port 98 so that the sediment or other obstructing material may be conveniently removed from these conduits.

With reference now to FIG. 7, the manifold conduit 90 to which the primary and secondary drainage conduits 86 and 88 of each of the vault cells 5 are connected ultimately drains into a liquid storage tank 100. A coupling 104 interconnects the terminus of the manifold conduit 90 with the tank 100. The tank 100 is further provided with a suction conduit 106 so that any liquid which collects therein may be conveniently and periodically removed. Additionally, electronic moisture detectors 108a,108b are provided at the lower portion of the collection tank 100 and at the terminus of the manifold 90, respectively. Each of these moisture detectors 108a,108b generates an electronic signal when liquid is detected either at the terminus of the manifold 90, or at the bottom of the collection tank 100. This signal may be remotely detected, as by for example a radio receiver of a data acquisition system, so that the system operators will know immediately when a leakage condition has occurred in one or more of the vault cells 5 without the necessity of manually inspecting the moisture detectors 94 disposed within the tunnel 15. Finally, a liquid level sensor 110 is provided within the collection tank 100. This liquid level sensor 110 likewise generates a remotely-receivable signal when the level of the liquid within the tank 100 rises above a predetermined level, thus alerting the system operators of the necessity of emptying the tank 100.

In the preferred method of the invention, the inspectable vault system 1 is constructed by first providing a recess in the earth, which may be either natural or formed by an excavation. Next, the compacted clay layer 21 is deposited over the recess, with the geomembrane 20 and gravel drain layer 19 following. The floor slab 18 of at least one vault cell 5 is then constructed. Thereafter, a wall assembly 22 is erected around the edges of the floor slab 18. Next, a ceiling slab is constructed over the top edges of the wall assembly 22. Following this, the track 73 is next installed around the interior of the wall assembly 22 in the configuration illustrated in FIG. 5C. After four disposal cells 5 have been constructed, the various layers of the earth cap 11 are then deposited over the ceiling slab 40 of each.

At this juncture, all of the static loads that the vault cell 5 is expected to bear have been applied to each cell 5. It is therefore appropriate that a close inspection be made of the interior of each constructed vault cell 5 to make sure that there are no water conducting cracks or other structural flaws present therein. This is a relatively simple matter, since there is no radioactive waste within the cells 5 at this point, and since further the removable wall structure 32 and permanent wall 36 of the front wall 26 of each have not yet been built.

Concurrently with the construction of the vault cells 5, the floor slab 60 of the loading aisle 7 is also built so as the provide a clear and supporting surface for a shielded forklift to stack the previously described SUREPAK ® modules within the vault cell 5.

If the vault cells 5 pass inspection after the earth cap 11 has been deposited thereover, radioactive waste is next loaded therein. The waste containers 69 are stacked in uniform rows from the back wall 24 toward the front wall 26 of each vault cell 5 until a densely stacked array 67 such as that illustrated in FIG. 5C is formed. During the waste loading operation, the system operators receive a minimum amount of radiation exposure due to the previously described shielding geometry afforded by the elongated shape of each of the vault cells 5. Additionally, the waste containers 69 are advantageously sheltered from the ambient weather during the loading operation (which may take as long as six months) thereby minimizing the amount of stray rain water which collects within the cell 5.

After a particular cell 5 has been fully loaded, the removable wall structure 32 is then constructed by stacking the plurality of interfitting blocks 34 into the configuration illustrated in FIG. 5B. When all the cells 5 of the system 1 have been completed and loaded, the permanent wall 36 of each is fabricated out of steel reinforced concrete, being careful to provide fracture lines and no reinforcement around the edges of frangible portion 38.

Both of the rows 3a,3b of vault cells 5 are built simultaneously in parallel, rather than completing one row 3a and then the other row 3b. Such parallel construction provides two opposing ledges 42 onto which the ceiling slab 64 of the loading aisle 7 may be built, which has the advantage of providing a water-shedding ceiling over at least part of the loading aisle 7.

In the event that one or more of the moisture detectors of the drainage system either remotely or manually indicates that a leakage condition has occurred within one of the cells 5 before permanent wall 36 has been fabricated, the system operators may lift out some of the interfitting blocks 34 that form the upper corner of the removable wall structure 32. A motorized video camera 75 may then be installed onto the track 73 in order to discover the specific zone 83a,83b where the leakage occurred. If the system operators decide that it would be necessary to remove the waste container 69 from a particular vault cell in order to repair a leakage condition, the wall 34 would be completely removed, and the contents of the damaged cell 5 would be temporarily moved into the empty cell 8 until the repair was completed, wherein upon the containers 69 could be reloaded into the repaired cells and the wall structure 32 and the interfitting blocks 34 reconstructed. Of course, the same procedure could be implemented after permanent wall 36 has been fabricated, albeit with somewhat more trouble, as the wall 36 of the leaking cell would have to be removed. Thus the invention provides an inspectable vault system in which structural flaws may be detected and corrected before any waste is loaded into any of the cells 5, and in which a drainage system tells the system operators of the occurrence as well as the location of a leakage condition. The invention also provides a system in which the contents of a damaged cell 5 may be conveniently and temporarily stored within an empty cell 8 until a repair has been effected. While the preferred embodiment of the invention is installed within a recess in the earth, the vault system of the invention may also be constructed and used above ground as well.

We claim:

1. A method for the disposal of hazardous radioactive waste, comprising by steps of:
    a. constructing a floor slab in the earth;
    b. constructing an elongated wall assembly over said floor slab having sidewalls and a front wall and a back wall at either end said side walls being longer than said front and back walls;
    c. providing an accessway in said front wall;
    d. constructing a ceiling slab over said wall assembly that is supported at least in part by said wall assembly to form a vault cell;

e. inspecting the vault cell for structural defects, and f. introducing hazardous radioactive waste through the accessway in said front wall and loading said cell with said waste from the back wall to the front wall in rows, each of which is substantially parallel to said back wall to minimize radiation exposure to workers loading the cell, and g. closing the accessway of the vault cell by constructing a removable wall structure within the accessway.

2. A method as defined in claim 1, further including the step of providing an earth cap over said ceiling slab prior to inspecting the resulting vault cell for structural faults.

3. A method as defined in claim 1, wherein said removable wall structure is constructed in said accessway by assembling a plurality of mutually interfitting wall elements.

4. A method as defined in claim 1, further comprising the step of constructing two parallel rows of vault cells separated by a loading aisle.

5. A method as defined in claim 4, further comprising the steps of constructing a ceiling slab over said loading aisle, and providing an earth cap over said loading aisle ceiling slab.

6. A method as defined in claim 4, wherein one of said vault cells is left empty to provide space for depositing the contents of another vault cell filled with waste in the event it becomes desirable to empty said other vault cell of its contents.

7. A method as defined in claim 1, wherein space is left between the inner walls of the vault cell and the waste loaded therein to define an aisleway for monitoring.

8. A method as defined in claim 1, wherein said waste is radioactive and is packaged in discrete units, and said vault cell is loaded by stacking rows of said waste units parallel to said back wall to minimize radiation exposure to workers.

9. A method for the disposal of radioactive waste, characterized by the steps of:
a. constructing a floor slab within a recess in the earth;
b. constructing an elongated wall assembly over said floor slab having sidewalls and a front wall and a back wall at either end said sidewalls being longer than said front and back walls;
c. providing an accessway in said front wall;
d. constructing a ceiling slab over said wall assembly that is supported at least in part by said wall assembly to form a vault cell;
e. providing an earth cap over said ceiling slab;
f. inspecting the vault cell for water conducting structural defects, and
g. introducing radioactive waste through the accessway and loading said cell with said waste from the back wall to the front wall in rows, each of which is substantially parallel to said back wall to minimize radiation exposure to workers.

10. A method for disposal of radioactive waste as defined in claim 9, wherein said waste is packaged in discrete units is loaded in rows within the vault cell, each of which is parallel to the back wall, said rows being formed sequentially from the back wall toward the front wall so that the waste in the frontmost row shields the area of the cell between the waste and the front wall from radiation emitted by the rows of waste behind it.

11. A method for disposal of radioactive waste as defined in claim 9, wherein said waste is packaged in discrete units, and wherein said waste is loaded within the vault cell by stacking said waste units into rows which are parallel to said back wall, said rows being formed sequentially from the back wall toward the front wall so that the waste in the frontmost row shields the area of the cell between the waste and the front wall from radiation emitted by the rows of waste behind it.

12. A method for disposal of radioactive waste as defined in claim 9, wherein space is left between the inner walls of the vault cell and the waste loaded therein to form an access aisle for monitoring equipment.

13. A method for disposal of radioactive waste as defined in claim 9, further comprising the steps of constructing two parallel rows of vault cells by repeating steps (a) through (e) for each additional cell, wherein the space between each of said rows of said cells defines a loading aisle.

14. A method for disposal of radioactive waste as defined in claim 13, further comprising the steps of constructing a ceiling slab over said loading aisle, and providing an earth cap over said loading aisle ceiling slab.

15. A method for disposal of radioactive waste as defined in claim 13, wherein one of said vault cells is left empty to provide space for depositing the contents of another vault cell filled with waste in the event it becomes desirable to empty said other vault cell of its contents.

16. A method for disposal of radioactive waste as defined in claim 13, further comprising the step of interconnecting the vault cells through expansion joints to structurally integrate the rows of vault cells while still allowing some stress relieving movement to occur between different vault cells.

17. A method for the disposal of radioactive waste within a vault system formed from individual vault cells, comprising the steps of:
a. constructing a floor slab in the earth;
b. constructing an elongated wall assembly over said floor slab having sidewalls a front wall and a back wall at either end, the length of said sidewalls being at least two times as long as its width;
c. constructing a ceiling slab over said wall assembly that is supported by said wall assembly to form a vault cell;
d. providing an earth cap over said ceiling slab;
e. inspecting the vault cell for structural defects, and
f. loading radioactive waste into the vault cell through the accessway in the front wall by stacking said waste in rows each of which is parallel to the back wall, said rows being formed sequentially from the back wall toward the front wall so that the waste forming the frontmost row shields the area of the cell between the waste and the front wall from radiation emitted by the rows of waste behind it.

18. A method for the disposal of radioactive waste as defined in claim 17, wherein the waste is packaged into units which are mutually stackable and mutually interfitting to form a substantially solid array of waste units.

19. A method for the disposal of radioactive waste as defined in claim 17, further including the step of closing the accessway of the vault cell by constructing a removable wall structure in said accessway.

20. A method for the disposal of radioactive waste as defined in claim 19, wherein said removable wall structure is constructed in said accessway by assembling plurality of mutually interfitting wall elements.

21. A vault system for the disposal of radioactive waste formed from at least one vault cell that comprises:
   a. a floor slab disposed within a recess in the earth;
   b. a ceiling slab disposed over said floor slab, and
   c. an elongated wall assembly disposed around the periphery of said floor slab for supporting said ceiling slab including sidewalls and a back wall and a front wall, said front wall having an accessway for loading radioactive waste within the wall assembly, wherein the elongated shape of the wall assembly reduces the amount of radiation present in the area of the cell between the waste disposed therein and the front wall accessway when the waste is loaded from the back wall to the front wall of the cell, and
   d. an aisleway defined between the inner side wall assembly and the waste loaded within the vault cell for accommodating monitoring equipment.

22. A vault system for the disposal of radioactive waste as defined in claim 21, wherein said vault system includes two rows of said vault cells that are separated by a loading aisle for loading and unloading radioactive waste from said cells.

23. A vault system for the disposal of radioactive waste as defined in claim 22, wherein said loading aisle includes a floor slab and a ceiling slab that are substantially coplanar with the floor slabs and ceiling slabs of the vault cells.

24. A vault system for the disposal of radioactive waste as defined in claim 22, wherein adjacent vault cells are interconnected by means of expansion joints to allow relative stress relieving movement between said cells.

25. A vault system for the disposal of radioactive waste as defined in claim 23, wherein said floor and ceiling slabs of said loading aisle are interconnected to said rows of vault cells by means of expansion joints to allow relative stress relieving movement therebetween.

26. A vault system for the disposal of radioactive waste as defined in claim 22, wherein one of said vault cells is empty to provide a space in said vault system for depositing the contents of a vault cell filled with waste in the event it becomes desirable to empty said filled cell of its contents.

27. A vault system for the disposal of radioactive waste as defined in claim 21, wherein the length of each vault cell is at least twice as long as its width to reduce the amount of radiation in the area of the cell between the waste disposed therein and the front wall accessway.

28. A vault system for the disposal of radioactive waste as defined in claim 21, wherein the length of each vault cell is at least five times as long as its width to reduce the amount of radiation in the area of the cell between the waste disposed therein and the front wall accessway.

* * * * *